US005476906A

United States Patent [19]
Yokoo et al.

[11] Patent Number: 5,476,906
[45] Date of Patent: Dec. 19, 1995

[54] IMPACT RESISTANT FRESNEL LENS

[75] Inventors: Kazuhiro Yokoo; Satoshi Honda; Hideaki Matsuura, all of Niihama, Japan

[73] Assignees: Sumitomo Chemical Company, Limited, Osaka; Dai Nippon Printing Company, Limited, Tokyo, both of Japan

[21] Appl. No.: 277,010

[22] Filed: Jul. 19, 1994

[51] Int. Cl.$^6$ .............................. C08L 33/08; C08L 33/10; C08L 25/10; C08L 25/14

[52] U.S. Cl. .......................... 525/310; 525/242; 525/302; 525/308; 525/309; 359/742

[58] Field of Search ................................. 525/310, 242, 525/302, 308, 309, 310; 359/742

[56] References Cited

U.S. PATENT DOCUMENTS 5,071,236  12/1991  Sudo et al. ................................ 359/742

FOREIGN PATENT DOCUMENTS 61-223701  4/1986  Japan .

*Primary Examiner*—W. Robinson Clark
*Attorney, Agent, or Firm*—Birch, Stewart, Kolasch & Birch

[57] ABSTRACT

The present invention provides an impact resistant Fresnel lens comprising a resin which is obtained by polymerizing a solution consisting essentially of (a) 100 parts by weight of a monomer mixture comprising an styrenic monomer in an amount of from 60 to 99 parts by weight and a (meth-)acrylic monomer of from 1 to 40 parts by weight, and (b) 1 to 50 parts by weight of a styrene-dienic copolymer based on 100 parts by weight of said monomer mixture based on 100 parts by weight of said monomer mixture. The Fresnel lens has a high refractive index and excellent transparency and impact resistance.

21 Claims, No Drawings

IMPACT RESISTANT FRESNEL LENS

BACKGROUND OF THE INVENTION

1. Field of the Invention

The present invention relates to a Fresnel lens having excellent optical properties and impact resistance.

2. Description of the Related Art

Rear projection screens are typically used for projecting expanded pictorial images from televisions or films in rooms having a significant amount of ambient light. The rear projection screens condense and diffuse incident light beams from a CRT (cathode ray tube) to regulate the optical path of the light beams so as to allow pictorial images to be sufficiently visible. As the rear projection screen, a screen comprising a Fresnel lens and a lenticular lens is generally used.

As the Fresnel lens has a number of grooves on the surface thereof, which are shaped during manufacturing, it is accordingly not made of glass but is conventionally made of a transparent resin, such as polystyrene or polymethyl methacrylate. Though polystyrene is a preferable material, having a large refractive index, the insufficient strength of polystyrene makes difficult the manufacture of large sized lenses from this material. Moreover, Fresnel lenses may be chipped or cracked by impact during manufacture or transportation. Such problems tend to arise especially in Fresnel lenses made of a styrene resin having a high refractive index.

Fresnel lenses made of cross-linked polystyrene have been proposed as a way of improving these disadvantages; for example, UNEXAMINED JAPANESE PATENT PUBLICATION No. 61-223701 discloses a synthetic resin lens prepared by polymerizing a styrenic monomer of not less than 0.4 weight fraction and a cross-linking agent of from 0.001 to 0.3 weight fraction.

While the disclosure in UNEXAMINED JAPANESE PATENT PUBLICATION No. 61-223701 was intended to improve the impact resistance of the lens by cross-linking the resin, it does not succeed in obtaining practically sufficient impact resistance.

SUMMARY OF THE INVENTION

An object of the present invention is to provide a Fresnel lens having not only a high refractive index and excellent transparency, but also excellent impact resistance.

This and other objects and advantages will be apparent from the following description.

The inventors of the present invention made extensive researches on the Fresnel lens and consequently discovered that the above object of the present invention can be accomplished by using a resin obtained by polymerizing a solution of a monomer mixture of styrenic monomer and (meth)acrylic monomer, and a specific amount of styrene-dienic copolymer. This invention has been made on the basis of the above findings.

Thus, the present invention provides an impact resistant Fresnel lens comprising a resin which is obtained by polymerizing a solution consisting essentially of (a) 100 parts by weight of a monomer mixture comprising a styrenic monomer in an amount of from 60 to 99 parts by weight and a (meth)acrylic monomer in an amount of from 1 to 40 parts by weight, and (b) 1 to 50 parts by weight of a styrene-dienic copolymer based on 100 parts by weight of said monomer mixture.

DETAILED DESCRIPTION OF THE INVENTION

The styrenic monomer to be used in the present invention is a compound having an benzene ring and a vinyl group or a vinylidene group in its molecular structure. Examples of suitable styrenic monomers are styrene derivatives such as styrene, chlorostyrene, bromostyrene, and $\alpha$-methylstyrene. Among them, styrene is preferred.

The amount of the styrenic monomer per 100 parts by weight of the monomer mixture is in the range of from 60 to 99 parts by weight, preferably from 75 to 95 parts by weight. An amount lower than 60 parts by weight decreases the refractive index of the resultant resin, while an amount larger than 99 parts by weight causes insufficient impact resistance and weather resistance.

The (meth)acrylic monomer to be used in the present invention is a monofunctional methacrylic ester or acrylic ester. Examples of suitable (meth)acrylic monomers are acrylic esters or methacrylic esters of aliphatic, alicyclic, or aromatic alcohols, such as methyl methacrylate, methyl acrylate, ethyl acrylate, ethyl methacrylate, isobutyl acrylate, isobutyl methacrylate, isopropyl acrylate, isopropyl methacrylate, t-butyl acrylate, t-butyl methacrylate, phenyl acrylate, phenyl methacrylate, cyclohexyl acrylate, and cyclohexyl methacrylate.

(Meth)acrylic esters of aliphatic or alicyclic alcohols are preferred. The (meth)acrylic monomers may be used alone, or as mixtures of two or more.

The amount of the (meth)acrylic monomer per 100 parts by weight of the monomer mixture is in the range of from 1 to 40 parts by weight, preferably from 5 to 25 parts by weight.

An amount lower than 1 parts by weight causes poor weather resistance of the resultant resin, while an amount higher than 40 parts by weight lowers the refractive index and transparency.

When the monomer mixture further comprises a multifunctional unsaturated monomer in addition to the styrenic monomer and the (meth)acrylic monomer, the product of the present invention having stronger impact resistance and higher transparency can be obtained.

The multifunctional unsaturated monomer to be used has at least two vinyl groups or vinylidene groups in its molecular structure. Examples of suitable multifunctional unsaturated monomers are ethylene glycol diacrylate, ethylene glycol dimethacrylate, diethylene glycol diacrylate, diethylene glycol dimethacrylate, triethylene glycol diacrylate, triethylene glycol dimethacrylate, neopentyl glycol diacrylate, neopentyl glycol dimethacrylate, hexanediol diacrylate, hexanediol dimethacrylate, di(meth)acrylates of bisphenol A, di(meth)acrylates of alkylene oxide-added bisphenol A, allyl methacrylate, and divinylbenzene.

The amount of the multifunctional unsaturated monomer per 100 parts by weight of the monomer mixture is usually in the range of from 0.01 to 39 parts by weight, preferably from 0.01 to 20 parts by weight, and more preferably from 0.1 to 15 parts by weight. If the multifunctional unsaturated monomer is present in an amount larger than 39 parts by weight, it may lower the refractive index of the resultant resin in some cases.

The styrene-dienic copolymer to be used in the present invention is a copolymer of a diene and styrene, which may include a copolymer in which residual double bonds of the diene component in the styrene-dienic copolymer are hydrogenated. Examples of the diene include butadiene, isoprene and the like.

The ratio of the styrene component to the diene component in the copolymer may be determined according to the characteristics required. The ratio of the styrene component is usually in the range of from 50 to 90 percent by weight, preferably from 55 to 80 percent by weight.

The styrene-dienic copolymer may be a random, block, or graft copolymer. Among them, a block copolymer is preferred, and a styrene-diene-styrene type triblock copolymer is more preferred. The structure of the copolymer may be either of the straight-chain type or the radial type.

The ratio of the styrene-dienic copolymer is in the range of from 1 to 50 parts by weight, preferably from 2 to 30 parts by weight, per 100 parts by weight of the monomer mixture. A ratio less than 1 part by weight does not sufficiently improve the impact resistance of the resultant resin, while a ratio exceeding 50 parts by weight may decrease the transparency in some cases.

In one process, for example, the styrene-dienic copolymer is dissolved in the monomer mixture and bulk polymerized to obtain the resin. A typical example of this bulk polymerization is cast polymerization. The resin obtained by cast polymerization is formed into a resin plate. The resin plate is then shaped into a Fresnel lens.

In an alternative process, a solution of the styrene-dienic copolymer and the monomer mixture is polymerized in a mold having the reverse shape of a Fresnel lens to directly obtain a Fresnel lens made of the resin.

The polymerization is promoted by a known method, for example, by addition of a known free-radical polymerization initiator, or a redox catalyst including a free-radical polymerization initiator and an accelerator, or by irradiation of ultraviolet rays or radioactive rays.

A coloring agent, a light diffusing agent, a reinforcing agent, a filler, a mold release agent, a stabilizing agent, an ultraviolet light absorber, an antioxidant, an antistatic agent, and a flame retardant can be mixed with the monomer mixture in advance.

In the above process where the resin plate is shaped to a Fresnel lens, the resin plate is pressed on a mold having a predetermined reverse shape of a Fresnel lens. The temperature is usually in the range of from 100° to 250 ° C., the pressure is usually in the range of from 10 to 300 kg/cm$^2$, and the time of heating and pressing is usually in the range of from 5 to 90 minutes.

Total light transmittance of the resin for the Fresnel lens in the present invention is usually in the range of from 80 to 92%, preferably from 85 to 92%. Haze value of the resin for Fresnel lens in the present invention is usually not more than 6%, preferably not more than 4%. Izod Impact Strength of the resin for the Fresnel lens in the present invention is usually in the range of from 2 to 10 kg.cm/cm, preferably from 3 to 10 kg. cm/cm. Refractive index of the resin for the Fresnel lens in the present invention is usually in the range of from 1.54 to 1.65, preferably from 1.56 to 1.6.

The Fresnel lens thus obtained and made of the resin has higher refractive index and transparency and stronger impact resistance than conventional Fresnel lenses.

EXAMPLES

The present invention is further described below with reference to the examples. However, such examples are merely illustrative and shall not be construed as limitative of the scope of the invention.

In the description below, the properties of a flat plate were measured in the following manner:

Total light transmittance and haze: measured with a haze meter according to ASTM D-1003;

Izod impact strength: measured according to ASTM D-256, except that the thickness of the sample was 3 mm; and Refractive index: measured with an Abbe refractometer according to ASTM D-542.

EXAMPLE 1

Twenty-five parts by weight of a styrene-butadiene copolymer (triblock type) containing approximately 75 percent by weight styrene units were dissolved while stirring in a monomer mixture containing 80 parts by weight of styrene and 20 parts by weight of methyl methacrylate. A homogeneous liquid composition was obtained by further dissolving 0.6 part by weight of benzoyl peroxide, a free-radical polymerization initiator, in the mixture of the copolymer and the monomer mixture. The liquid composition was poured into a cell composed of a gasket and two glass plates, and polymerized in a water bath at 80° C. for five hours and subsequently in an air bath at 120° C. for one hour.

Table 1 shows the properties of the transparent resin plate thus obtained.

The resin plate was placed on a mold having a shape corresponding to a Fresnel lens (focal length: 1 m; pitch: 0.5 mm), which was previously formed by cutting a brass plate of 1,200 mm×1,200 mm×2 mm. The resin plate was then pressed to a Fresnel lens with a pressing machine for one hour at a temperature of 120° C., and under a pressure of 30 kg/cm$^2$.

No cracking or chipping was observed during pressing.

The Fresnel lens of Example 1 showed sufficient optical performance.

EXAMPLE 2

Twenty-five parts by weight of the styrene-butadiene copolymer used in Example 1 was dissolved while stirring in a monomer mixture containing 80 parts by weight of styrene, 19 parts by weight of methyl methacrylate, and 1 part by weight of neopentyl glycol dimethacrylate. A homogeneous liquid composition was obtained by further dissolving 0.6 part by weight of benzoyl peroxide in the mixture of the copolymer and the monomer mixture. A transparent resin plate was prepared by polymerizing the liquid composition in the same manner as in Example 1. The properties of the resin plate thus obtained are shown in Table 1.

A Fresnel lens was then prepared by pressing the resin plate in the same manner as in Example 1. No cracking or chipping was observed during pressing. The Fresnel lens showed sufficient optical performance.

COMPARATIVE EXAMPLE 1

A homogeneous liquid composition was obtained by sufficiently stirring a mixture of 80 parts by weight of styrene, 20 parts by weight of methyl methacrylate, and 0.6 part by weight of benzoyl peroxide. A transparent resin plate was prepared by polymerizing the liquid composition in the same manner as in Example 1. The properties of the resin plate thus obtained are shown in Table 1.

A Fresnel lens was then prepared by pressing the resin plate in the same manner as in Example 1. Though the Fresnel lens showed sufficient optical performance, cracking was sometimes observed during pressing.

COMPARATIVE EXAMPLE 2

The procedure of Comparative Example 1 was repeated except that a homogenous liquid composition was obtained by sufficiently stirring a mixture of 80 parts by weight of styrene, 20 parts by weight of methyl methacrylate, 0.6 part by weight of benzoyl peroxide, and 1 part by weight of neopentyl glycol dimethacrylate.

The properties of the resin plate thus obtained are shown in Table 1. Though the Fresnel lens thus obtained showed sufficient optical performance, cracking was sometimes observed during pressing.

TABLE 1

|  | Example 1 | Example 2 | Comparative Example 1 | Comparative Example 2 |
| --- | --- | --- | --- | --- |
| total light transmittance (%) | 90 | 90 | 90 | 90 |
| Haze (%) | 3 | 2 | 1 | 1 |
| Refractive index | 1.57 | 1.57 | 1.57 | 1.57 |
| Izod Impact Strength (kg · cm/cm) | 3 | 5 | 1 | 1.5 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An impact resistant Fresnel lens consisting essentially of a resin which is obtained by polymerizing a solution consisting essentially of:
   (a) 100 parts by weight of a monomer mixture comprising a styrenic monomer in an amount of from 60 to 99 parts by weight and a (meth)acrylic monomer of from 1 to 40 parts by weight, and
   (b) 1 to 50 parts by weight of a styrene-dienic copolymer based on 100 parts by weight of said monomer mixture.

2. The Fresnel lens according to claim 1, wherein said monomer mixture further comprises a multifunctional unsaturated monomer in an amount of from 0.01 to 39 parts by weight based on 100 parts by weight of said monomer mixture.

3. The Fresnel lens according to claim 2, wherein the amount of said multifunctional unsaturated monomer is from 0.01 to 20 parts by weight based on 100 parts by weight of said monomer mixture.

4. The Fresnel lens according to claim 1, wherein the amount of said styrene-dienic copolymer is 2 to 30 parts by weight based on 100 parts by weight of said monomer mixture.

5. The Fresnel lens according to claim 1, wherein the amount of a styrene component in said styrene-dienic copolymer is in the range from 50 to 90 percent by weight based on the weight of said styrene-dienic copolymer.

6. The Fresnel lens according to claim 1, wherein said styrene-dienic copolymer is a block copolymer.

7. The Fresnel lens according to claim 1, wherein said resin comprises a surface, and wherein said surface comprises grooves shaped into said surface.

8. The Fresnel lens according to claim 7, wherein said grooves have been shaped into said resin surface by cast polymerizing said solution into the shape of a plate, and pressing said resin plate onto a mold having the reverse shape of a Fresnel lens.

9. The Fresnel lens according to claim 7, wherein said grooves have been shaped into said resin surface by polymerizing said solution in a mold having the reverse shape of a Fresnel lens, and removing the resulting lens from said mold.

10. The Fresnel lens according to claim 1, wherein said styrenic monomer is selected from the group consisting of styrene, chlorostyrene, bromostyrene, α-methylstyrene, and mixtures thereof.

11. The Fresnel lens according to claim 1, wherein said (meth)acrylic monomer is selected from the group consisting of methyl methacrylate, methyl acrylate, ethyl acrylate, ethyl methacrylate, isobutyl acrylate, isobutyl methacrylate, isopropyl acrylate, isopropyl methacrylate, t-butyl acrylate, t-butyl methacrylate, phenyl acrylate, phenyl methacrylate, cyclohexyl acrylate, cyclohexyl methacrylate and mixtures thereof.

12. The Fresnel lens according to claim 2, wherein said multifunctional unsaturated monomer is selected from the group consisting of ethylene glycol diacrylate, ethylene glycol dimethacrylate, diethylene glycol diacrylate, diethylene glycol dimethacrylate, triethylene glycol diacrylate, triethylene glycol dimethacrylate, neopentyl glycol diacrylate, neopentyl glycol dimethacrylate, hexanediol diacrylate, hexanediol dimethacrylate, di(meth)acrylates of bisphenol A, di(meth)acrylates of alkylene oxide-added bisphenol A, allyl methacrylate, divinylbenzene, and mixtures thereof.

13. The Fresnel lens according to claims 1, wherein said styrene-dienic copolymer comprises a diene moiety selected from the group consisting of butadiene, isoprene, and mixtures thereof.

14. A method for preparing an impact resistant Fresnel lens comprising:
   (1) forming a resin by polymerizing a solution consisting essentially of:
      (a) 100 parts by weight of a monomer mixture comprising a styrenic monomer in an amount of from 60 to 99 parts by weight, and a (meth)acrylic monomer in an amount of from 1 to 40 parts by weight; and
      (b) 1 to 50 parts by weight of a styrene-dienic copolymer based on 100 parts by weight of said monomer mixture; and
   (2) shaping said resin into the shape of a Fresnel lens.

15. The method according to claim 14, wherein said monomer mixture further comprises a multifunctional unsaturated monomer in an amount of from 0.01 to 39 parts by weight based on 100 parts by weight of said monomer mixture.

16. The method according to claim 14, wherein the amount of said styrene-dienic copolymer is 2 to 30 parts by weight based on 100 parts by weight of said monomer mixture.

17. The method according to claim 14, wherein the amount of styrene component in said styrene-dienic copolymer is in the range of from 50 to 90 percent by weight based on the weight of said styrene-dienic copolymer.

18. The method according to claim 14, wherein said styrene-dienic copolymer is a block copolymer.

19. The method according to claim 14, wherein said polymerizing comprises polymerizing said solution into a resin plate, and said shaping comprises pressing said resin plate onto a mold for a Fresnel lens.

20. The method according to claim 14, wherein said polymerizing and said shaping are carried out substantially simultaneously by polymerizing said solution in a mold having the shape of a Fresnel lens.

21. An impact resistant Fresnel lens consisting essentially of a resin which is obtained by polymerizing a solution consisting essentially of:

(a) 100 parts by weight of a monomer mixture comprising a styrenic monomer in an amount of from 60 to 99 parts by weight and a (meth)acrylic monomer of from 1 to 40 parts by weight, and (b) 1 to 50 parts by weight of a styrene-dienic copolymer based on 100 parts by weight of said monomer mixture, wherein said Fresnel lens has a shaped surface which exhibits significant refractive properties, and wherein the resin has a refractive index of from 1.54 to 1.65.

* * * * *